(12) United States Patent
Ueda et al.

(10) Patent No.: US 8,375,693 B2
(45) Date of Patent: Feb. 19, 2013

(54) YARN

(75) Inventors: Takahisa Ueda, Sanda (JP); Takashi Ikeda, Sanda (JP); Katsunori Sugita, Sanda (JP); Masaru Fujiwara, Sanda (JP); Hiroki Tanabe, Sanda (JP); Kodai Inoue, Sanda (JP)

(73) Assignee: Nippon Pillar Packing Co., Ltd., Osaka-shi, Osaka (JP)

( * ) Notice: Subject to any disclaimer, the term of this patent is extended or adjusted under 35 U.S.C. 154(b) by 8 days.

(21) Appl. No.: 13/062,819

(22) PCT Filed: Aug. 10, 2009

(86) PCT No.: PCT/JP2009/064126
§ 371 (c)(1),
(2), (4) Date: Mar. 8, 2011

(87) PCT Pub. No.: WO2010/029829
PCT Pub. Date: Mar. 18, 2010

(65) Prior Publication Data
US 2011/0162338 A1    Jul. 7, 2011

(30) Foreign Application Priority Data

Sep. 10, 2008  (JP) ................................. 2008-232044
Sep. 10, 2008  (JP) ................................. 2008-232045

(51) Int. Cl.
*D02G 3/36* (2006.01)
(52) U.S. Cl. ........................................... 57/235; 57/260
(58) Field of Classification Search .................... 57/200, 57/210, 235, 260; 277/529, 535, 536, 537, 277/538
See application file for complete search history.

(56) References Cited

U.S. PATENT DOCUMENTS

| | | | |
|---|---|---|---|
| 6,270,083 B1 * | 8/2001 | Hirschvogel et al. | 277/536 |
| 6,299,976 B1 | 10/2001 | Tsukamoto | |
| 6,385,956 B1 * | 5/2002 | Ottinger et al. | 57/200 |
| 6,502,382 B1 * | 1/2003 | Fujiwara et al. | 57/200 |
| 6,601,377 B2 * | 8/2003 | Tsukamoto | 57/200 |
| 6,708,479 B1 * | 3/2004 | Fujiwara et al. | 57/200 |
| 2002/0069635 A1 * | 6/2002 | Tsukamoto | 57/200 |
| 2003/0042691 A1 | 3/2003 | Tsukamoto et al. | |
| 2004/0151905 A1 * | 8/2004 | Tsukamoto et al. | 428/373 |

FOREIGN PATENT DOCUMENTS

| | | |
|---|---|---|
| DE | 10 2005 048 169 | 12/2006 |
| EP | 601670 A1 * | 6/1994 |
| JP | 2000-320681 | 11/2000 |
| JP | 2003-65441 | 3/2003 |
| JP | 2006-349070 | 12/2006 |
| JP | 2007-125694 | 5/2007 |

* cited by examiner

*Primary Examiner* — Shaun R Hurley
(74) *Attorney, Agent, or Firm* — Rankin, Hill & Clark LLP

(57) ABSTRACT

A yarn which is configured by using expanded graphite and polytetrafluoroethylene (PTEE) is provided while improving the yarn so that the expanded graphite functioning as a core member is not exposed and it can be simply produced. The yarn is formed by: forming a base member configured by enveloping an expanded graphite sheet member with a PTEE film, in a state where the PTEE film and the expanded graphite sheet member are aligned with each other in longitudinal direction; and twisting the base member. The base member has an approximately circular sectional shape, and is configured by enveloping the expanded graphite sheet member having a rounded sectional shape with the PTEE film which is rounded in a pipe-like shape.

9 Claims, 8 Drawing Sheets

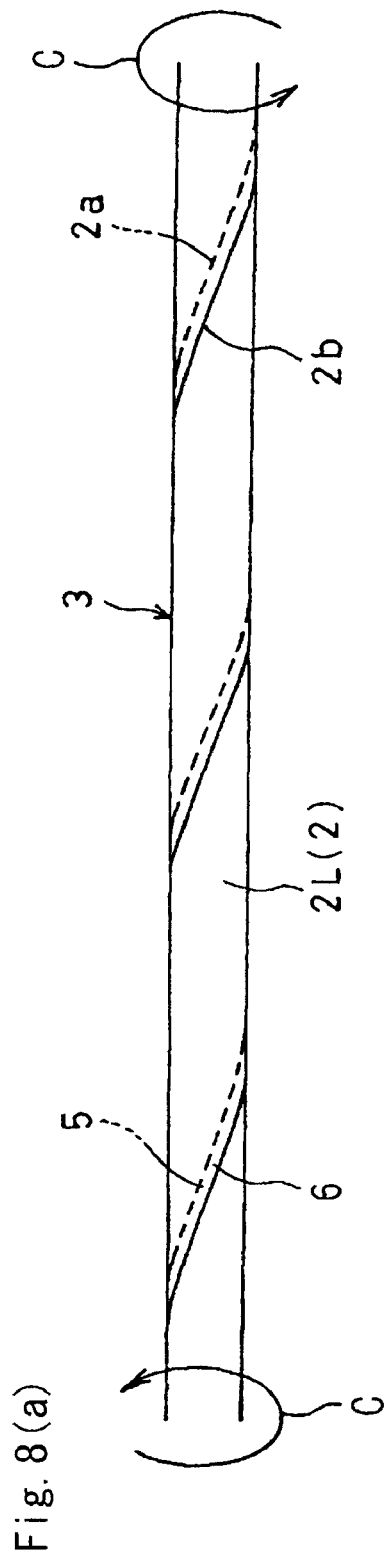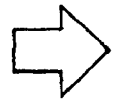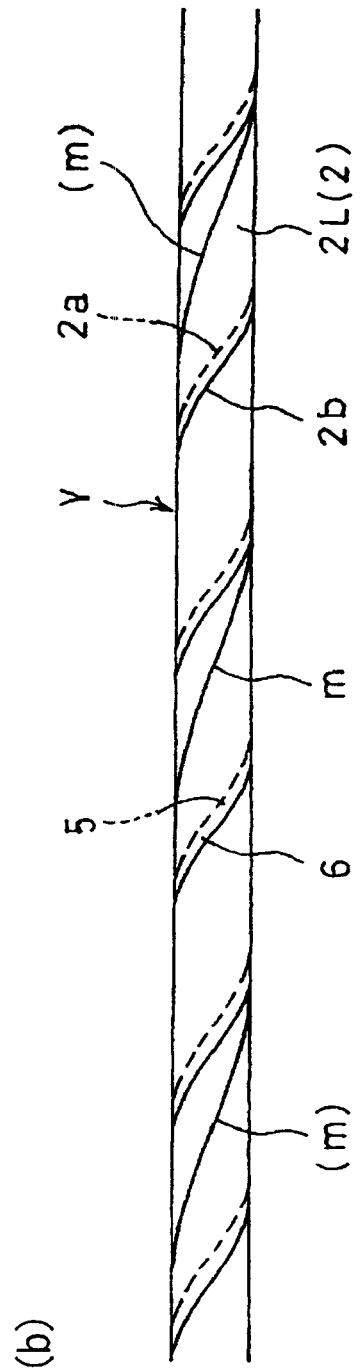

YARN

TECHNICAL FIELD

The present invention relates to a yarn which is preferably used in a gland packing that is to be used in a seal part of a fluid apparatus such as a pump or a valve.

BACKGROUND ART

As a conventional art related to a gland packing which is used in a shaft seal part of a fluid apparatus such as a pump or a valve, or a yarn (braiding yarn) used in it, a configuration which uses expanded graphite is conventionally known. Patent Literature 1 and Patent Literature 2 disclose configurations which use PTEE (polytetrafluoroethylene) in addition to expanded graphite.

Namely, the configurations were created with the objective of, while maintaining a high compression restoration property and adaptability which are original properties of expanded graphite, forming a yarn in which the tensile strength and the toughness are high, and which therefore can exert a high sealing property as a packing. However, the configurations of Patent Literature 1 and 2 have the following problem.

The configurations are formed by winding a sheet of PTEE or the like around expanded graphite or high-strength material which functions as a core, or by laminating PTEE to the surface of an expanded graphite tape. Therefore, the core material (expanded graphite) is easily exposed. Since the sheet is spirally wound, there is also a disadvantage that their production requires a relatively long time.

In summary, in a yarn produced by the winding (spiral winding) method, since a sheet made of PTEE or the like is wound around a core member, the core material tends to be exposed, and a long production time is required. In a yarn produced by the laminate method, a problem that the core member is exposed from both end portions of the sheet remains to be solved.

PRIOR ART LITERATURE

Patent Literature

Patent Literature 1: Japanese Patent Application Laid-Open No. 2000-320681
Patent Literature 2: Japanese Utility Model Registration No. 2,600,887

SUMMARY OF THE INVENTION

Problems to be Solved by the Invention

It is an object of the invention to provide a yarn which is configured by using expanded graphite and PTEE that are preferably used in a gland packing, while improving the yarn so that the expanded graphite functioning as a core member is not exposed and it can be simply produced.

Means for Solving the Problem

One aspect of the invention is characterized in that a yarn is formed by twisting a base member 3 configured by enveloping an expanded graphite sheet member 1 with a PTEE film 2, in a state where the PTEE film 2 and the expanded graphite sheet member 1 are aligned with each other in longitudinal direction.

One aspect of the invention is characterized in that, the base member 3 is configured by winding the PTEE film 2 around the expanded graphite sheet member 1 having a rounded sectional shape.

One aspect of the invention is characterized in that, a reinforcing member H is placed inside and/or outside the expanded graphite sheet member 1.

One aspect of the invention is characterized in that, the expanded graphite sheet member 1 and the PTEE film 2 or/and overlapping portions 5, 6 of the PTEE film 2 are bonded together.

One aspect of the invention is characterized in that, a weight percentage of the PTEE film 2 is set to 5 to 30%.

One aspect of the invention is characterized in that a yarn is formed by enveloping an expanded graphite sheet member 1 with a PTEE film 2 which is armor-wound, in a state where the PTEE film 2 and the expanded graphite sheet member 1 are aligned with each other in longitudinal direction.

One aspect of the invention is characterized in that, the yarn is formed by twisting a base member 3 configured by enveloping the expanded graphite sheet member 1 with the PTEE film 2 which is armor-wound.

One aspect of the invention is characterized in that, the expanded graphite sheet member 1 enveloped with the PTEE film 2 which is armor-wound has a rounded sectional shape.

One aspect of the invention is characterized in that, a reinforcing member H is placed inside and/or outside the expanded graphite sheet member 1.

One aspect of the invention is characterized in that, the expanded graphite sheet member 1 and the PTEE film 2 or/and overlapping portions 5, 6 of the PTEE film 2 are bonded together.

One aspect of the invention is characterized in that, a weight percentage of the PTEE film 2 is set to 5 to 30%.

EFFECTS OF THE INVENTION

According to one aspect of the invention, because of the structure where the expanded graphite sheet member is enveloped with the PTEE film which is pulled and aligned in longitudinal direction, expanded graphite is not exposed while the elasticity of the expanded graphite is maintained. The structure where the expanded graphite sheet member is covered by the PTEE film is formed not by the spiral winding as in the conventional art, but by the simple winding envelope while aligning the mutual longitudinal directions with each other. Therefore, the covering structure is simplified, the production is facilitated, and also the cost can be lowered by reducing the required amount of the PTEE film. As a result, it is possible to provide a yarn which is configured by using expanded graphite and PTEE while improving the yarn so that the expanded graphite functioning as a core member is not exposed and it can be simply produced. When a structure where a rounded expanded graphite sheet member is wound with a PTEE film is employed, the yarn can have a sectional shape which is preferred as a yarn.

According to one aspect of the invention, the longitudinal directions of the PTEE film and the expanded graphite sheet member are aligned with each other. Therefore, there is an advantage that the reinforcing member of the inside, outside, or both sides which is placed in the state where it is coincident with the longitudinal direction in order to enhance the strength of the expanded graphite sheet member can be easily enveloped with the PTEE film.

According to one aspect of the invention, it is possible to provide a yarn in which the adhesion can improve the strength as the base member, or completely eliminate the possibility that the overlapping portions of the PTEE film are opened and the inside expanded graphite sheet member is exposed, and which has also an advantage that the stability and the reliability are higher.

According to one aspect of the invention, it is possible to provide a yarn which is excellent in property in the case where a product (such as a gland packing) is formed by using the yarn, i.e., which has a high sealing property.

According to one aspect of the invention, because of the structure where the expanded graphite sheet member is enveloped by armor-winding with the PTEE film, i.e., not a structure which is formed by the spiral winding as in the conventional art, but a structure where the expanded graphite sheet member is windingly covered by forming an overlapping length while twisting the film in the state the film and the expanded graphite sheet member are aligned with each other in longitudinal direction, expanded graphite is prevented from being exposed, while maintaining the elasticity of expanded graphite. Moreover, the expanded graphite sheet member is covered by the armor-winding which is formed by twisting the PTEE film along the longitudinal direction. Therefore, the covering structure is simplified, the production is facilitated, and also the cost can be lowered by reducing the required amount of the PTEE film. As a result, it is possible to provide a yarn which is configured by using expanded graphite and PTEE while improving the yarn so that the expanded graphite functioning as a core member is not exposed and it can be simply produced.

When the base member configured by enveloping the expanded graphite sheet member with armor-winding is further twisted to be formed as a yarn, the strength can be improved, and it is convenient. When a structure in which a rounded expanded graphite sheet member is enveloped by a PTEE film is formed, the yarn can have a sectional shape which is preferred as a yarn.

According to one aspect of the invention, the longitudinal directions of the PTEE film and the expanded graphite sheet member are aligned with each other. Therefore, a further advantage that the reinforcing member which is included in order to enhance the strength in the state where it is coincident with the longitudinal direction of the expanded graphite sheet member can be easily enveloped by the PTEE film that is armor-wound is added.

According to one aspect of the invention, it is possible to provide a yarn in which the adhesion can improve the strength as the base member, or completely eliminate the possibility that the overlapping portions of the PTEE film are opened and the inside expanded graphite sheet member is exposed, and which has also an advantage that the stability and the reliability are higher.

According to one aspect of the invention, it is possible to provide a yarn which is excellent in property in the case where a product (such as a gland packing) is formed by using the yarn, i.e., which has a high sealing property.

BRIEF DESCRIPTION OF THE DRAWINGS

FIG. 8 is a partial view showing a yarn of Embodiment 5.

BEST MODE FOR CARRYING OUT THE INVENTION

Hereinafter, embodiments of the yarn of the invention will be described with reference to the drawings.

Embodiment 1

Figure 1:
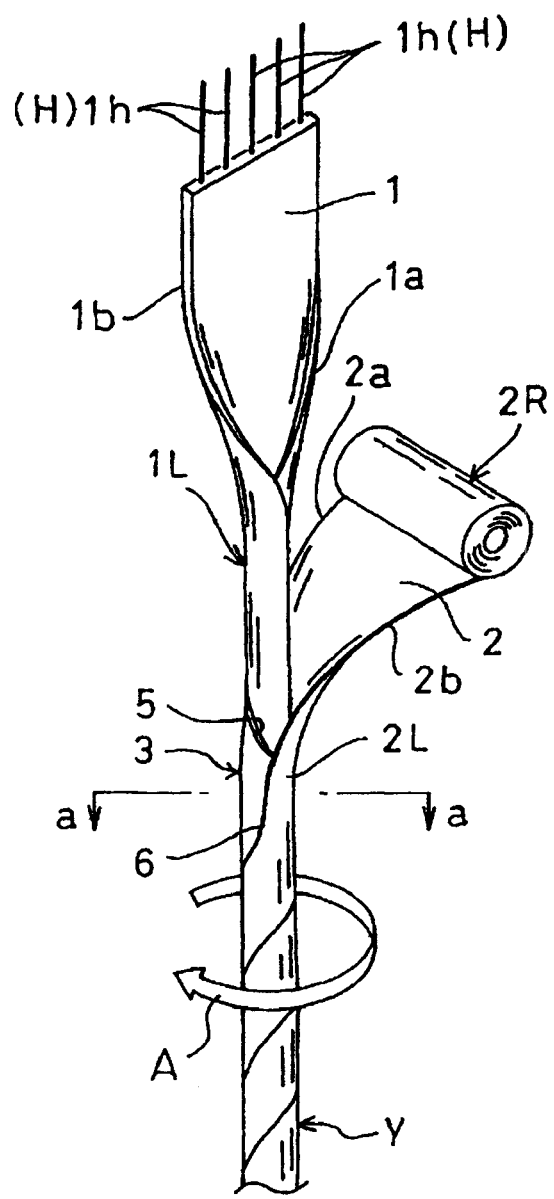
FIG. 1 is a functional view showing a yarn of Embodiment 1 and a method of producing it.
Figure 2:
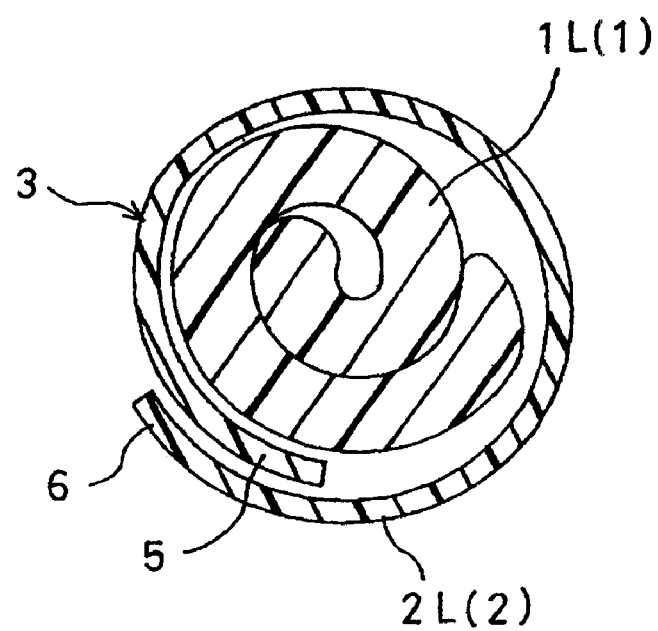
FIG. 2 is a sectional view taken along line a-a in FIG. 1.

As shown in FIGS. 1 and 2, a yarn Y of Embodiment 1 is formed by twisting a base member 3 configured by enveloping an expanded graphite sheet member 1 with a PTEE film 2, in a state where the PTEE film 2 and the expanded graphite sheet member 1 are aligned with each other in longitudinal direction. Namely, although described later, the yarn is a yarn (braiding yarn) configured by enveloping the internally reinforced expanded graphite sheet member 1 which is rounded to have an outer diameter of 2 mm, with the PTEE film 2.

The expanded graphite sheet 1 which is a core member is formed by using expanded graphite (internally reinforced expanded graphite) which has an elongated shape, which incorporates a plurality of reinforcing wires $1h$ (an example of a reinforcing member H) in a parallel state, and which has a flat rectangular sectional shape. The expanded graphite sheet 1 is folded so as to be wound to attain a state where one end $1a$ of the width direction is inside (or outside) the other end $1b$, and formed into a roll-shaped sheet 1L (see FIG. 2).

As shown in FIG. 1, for example, the PTEE film 2 is used in the form of a long film which is obtained by unwinding a film roll 2R that is wound into roll form. The PTEE film 2 which is drawn out in the longitudinal direction is folded so as to be wound to attain a state where one end $2a$ is inside (or outside) the other end $2b$, whereby the film is formed into a roll-shaped film 2L. A base member 3 is produced by covering and enveloping the roll-shaped sheet 1L with the roll-shaped film 2L.

As shown in FIG. 2, the base member 3 is configured by winding the PTEE film around the expanded graphite sheet member 1 having a rounded sectional shape, i.e., has a rounded sectional shape as a whole in a state where the expanded graphite sheet member 1 is not exposed. Then, the base member 3 is twisted in the direction of arrow A to be formed into the yarn Y. The weight percentage of the PTEE film 2 in the yarn Y of Embodiment 1 (the weight percentage of the PTEE film 2 with respect to the weight per unit length of the yarn Y) was 22.1%.

Alternatively, the expanded graphite sheet member 1 and the PTEE film 2, i.e., the outer circumferential surface of the roll-shaped sheet 1L and the inner circumferential surface of the roll-shaped film 2L may be bonded together by, for example, using an adhesive agent. Alternatively, overlapping portions 5, 6 of the PTEE film 2, i.e., the roll-shaped film 2L may be bonded together. Alternatively, a configuration where both of the bondings are performed may be possible.

Embodiment 2

Figure 3:
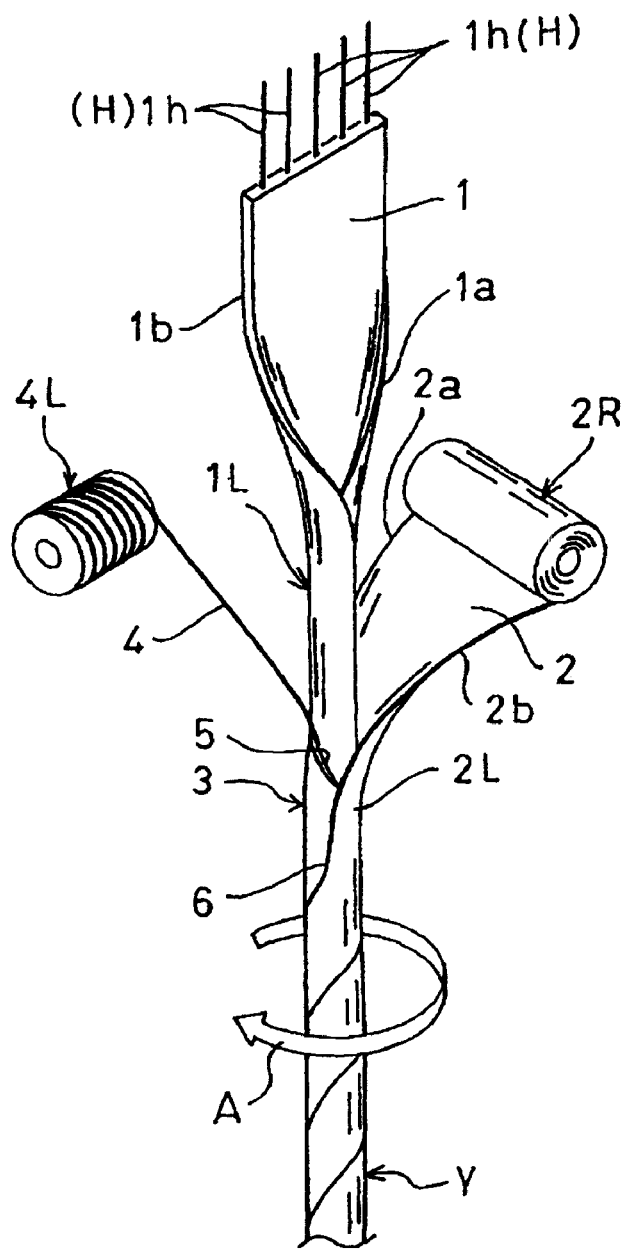
FIG. 3 is a functional view showing a yarn of Embodiment 2 and a method of producing it.

As shown in FIG. 3, the yarn Y of Embodiment 2 is configured by unwinding a stainless steel wire 4 (an example of the reinforcing member H) which functions as an external reinforcing member, from a wind roll 4L of a stainless steel wire (for example: thickness of 0.1 mm), and enveloping the stainless steel wire together with the roll-shaped sheet 1L formed by the expanded graphite sheet member 1, with the PTEE film 2. Namely, the yarn has the configuration where also the external reinforcement is applied to the yarn Y of Embodiment 1. The yarn Y which is excellent in mechanical characteristics is realized by the internal and external reinforcements due to the reinforcing wires 1$h$(H) that constitute the internal reinforcement, and the stainless steel wire 4(H) that constitutes the external reinforcement.

[Gland Packing]

For reference, although not illustrated, a gland packing is configured by bundling a plurality (for example, eight) of above-described yarns Y (of Embodiment 1 or 2) in the periphery of a core member (the core member may be omitted), and twisting or braiding (eight-strand square braiding or the like) to form a cord-like shape. When the cord-like shape is continuously rounded to be compression-molded, it is possible to form a gland packing in which a section has a rectangular shape, and the whole shape has a doughnut-like annular shape. For example, the gland packing is attached to a packing box in a state where a plurality of gland packings are arranged in the axial direction of a rotation shaft, and pressed by a packing cover in the axial direction, thereby enabling the packing to be used so as to exert a sealing function on the outer circumferential surface of the rotation shaft.

According to the yarn Y of the invention related to Embodiments 1 and 2, it is possible to attain functions and effects such as following 1. to 5. 1. Because of the structure where the expanded graphite sheet member 1 is enveloped with the PTEE film 2 which is pulled and aligned in longitudinal direction, the expanded graphite is not exposed while the elasticity of the expanded graphite is maintained. 2. Since the longitudinal directions of the PTEE film 2 and the expanded graphite sheet member 1 are aligned with each other, the reinforcing wire member such as a metal wire or carbon fiber which is included in order to enhance the strength in the state where it is coincident with the longitudinal direction of the expanded graphite sheet member 1 can be enveloped easily and simultaneously by the PTEE film 2.

3. Since the PTEE film 2 is placed in the surface to eliminate the exposure of the expanded graphite which is the core material, the corrosion resistance and the sliding characteristics can be improved. 4. The structure where the expanded graphite sheet member 1 is covered by the PTEE film 2 is formed not by the spiral winding as in the conventional art, but by the simple winding envelope while aligning the mutual longitudinal directions with each other. Therefore, the required amount of the PTEE film 2 can be reduced, and the cost reduction can be realized while attaining the stability at a high temperature. 5. Since the structure where the expanded graphite sheet member 1 is covered by the PTEE film 2 is formed by the simple winding envelope while aligning the mutual longitudinal directions with each other, the tensile strength of the PTEE film 2 itself can be used, and the strength of the yarn Y can be improved.

Embodiment 3

Figure 4:
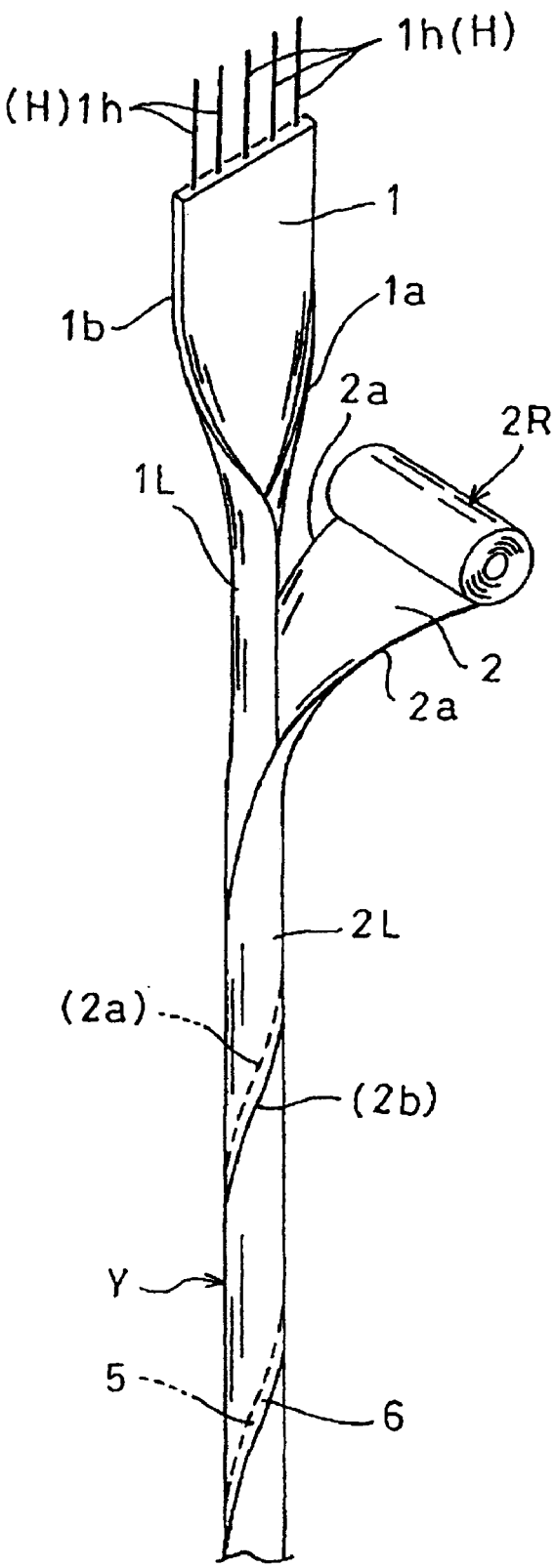
FIG. 4 is a perspective view showing a yarn of Embodiment 3 and a manner of producing it.
Figure 5:
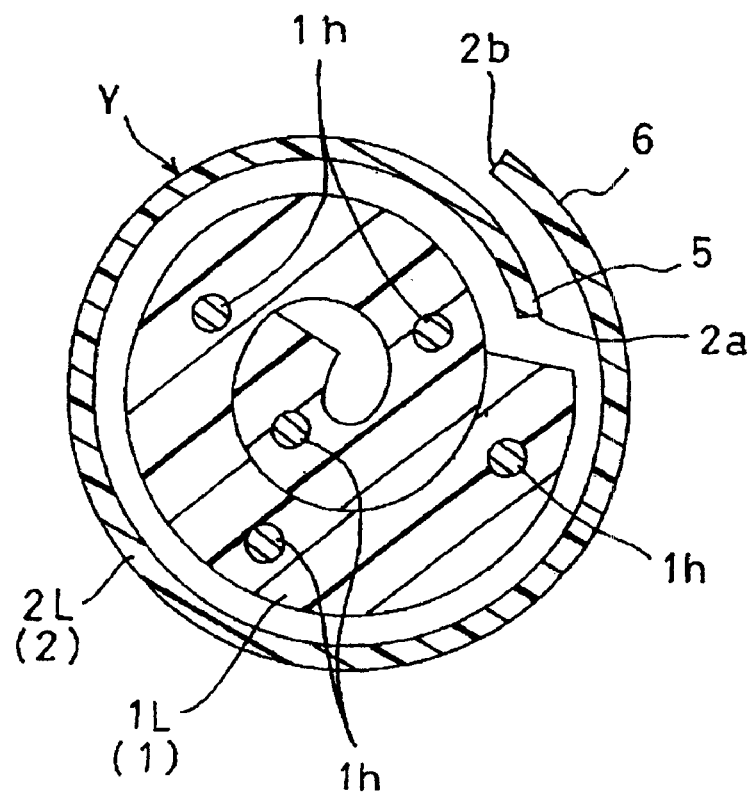
FIG. 5 is a sectional view of the yarn of FIG. 4.

As shown in FIGS. 4 and 5, the yarn Y of Embodiment 3 is formed by enveloping the expanded graphite sheet member 1 with the PTEE film 2 which is armor-wound, in a state where the PTEE film 2 and the expanded graphite sheet member 1 are aligned with each other in longitudinal direction. Namely, although described later, the yarn is a yarn (braiding yarn) configured by enveloping the internally reinforced expanded graphite sheet member 1 which is rounded to have an outer diameter of 2 mm, with the PTEE film 2.

The expanded graphite sheet 1 which is a core member is formed by using expanded graphite (internally reinforced expanded graphite) which has an elongated shape, which incorporates a plurality of reinforcing wires 1$h$ (an example of a reinforcing member H) in a parallel state, and which has a flat rectangular sectional shape. The expanded graphite sheet 1 is simply folded along the longitudinal direction so as to be internally wound to attain a state where one end 1$a$ of the width direction is inside (or outside) the other end 1$b$, and formed into a roll-shaped sheet 1L (see also FIG. 5).

As shown in FIG. 4, for example, the PTEE film 2 is used in the form of a long film which is obtained by unwinding the film roll 2R that is wound into roll form. The PTEE film 2 which is drawn out in the longitudinal direction is wound so that, as in the principle of the armor-winding shown in FIG. 6, the longitudinal directions of one width-direction end 2$a$ and the other width-direction end 2$b$ are twisted in opposite directions to attain a state where the one end is inside (or outside) the other end, i.e., the PTEE film is armor-wound to be formed into the roll-shaped film 2L. The roll-shaped sheet 1L is covered and enveloped with the roll-shaped film 2L, whereby the yarn Y is formed.

Figure 6A:
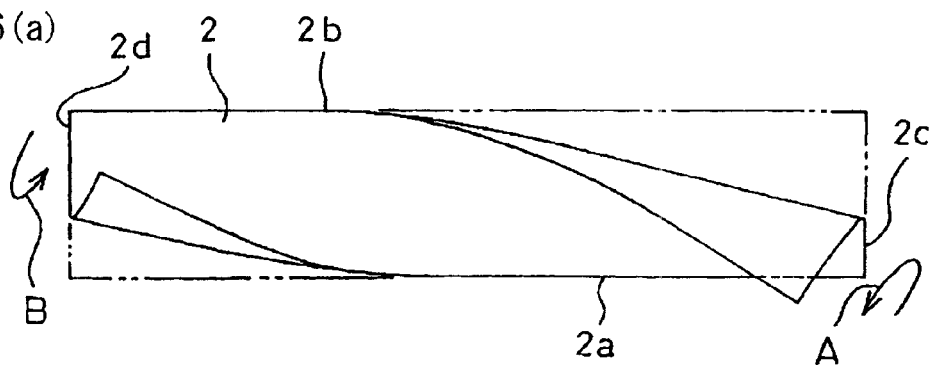
FIG. 6 is a functional view showing the principle of armor-winding of a PTEE film.
Figure 6B:
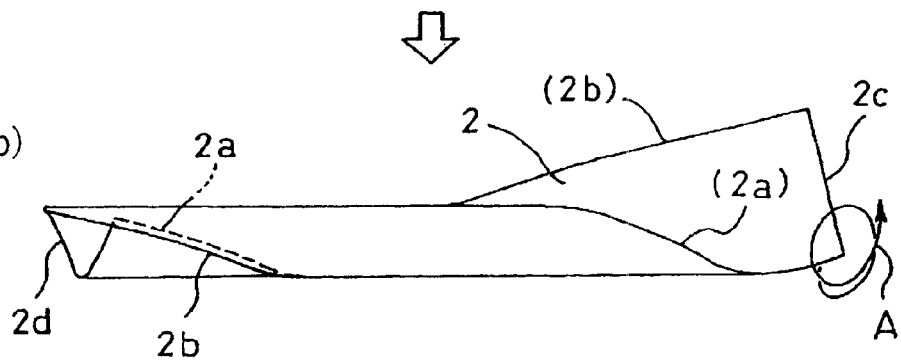
Figure 6C:
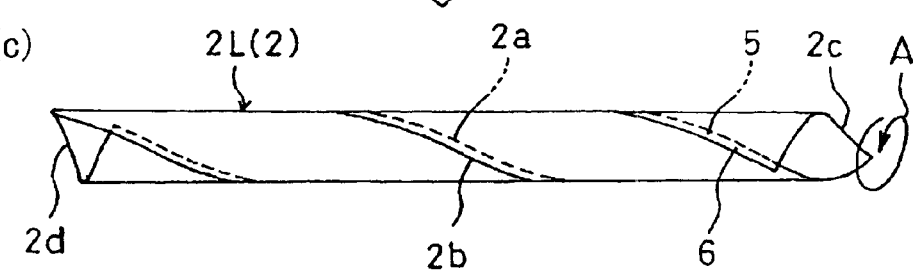

The principle of the armor-winding will be described with reference to FIG. 6. As shown in FIG. 6($a$), for example, one longitudinal-direction end 2$c$ of the long PTEE film 2 having a certain length is twisted in the direction of arrow A, and the other longitudinal-direction end 2$d$ is twisted in the direction of arrow B which is opposite to the direction of arrow A, whereby the film is started to be rounded along the longitudinal direction. As shown in FIG. 6($b$), then, the one longitudinal-direction end 2$c$ is successively twisted, so that the film is wound into roll form in a state where the one width-direction end 2$a$ is inside the other width-direction end 2$b$, and the one end 2$a$ and the other end 2$b$ have overlapping portions.

Furthermore, the one longitudinal-direction end 2$c$ is twisted in the direction of arrow A, thereby producing the roll-shaped film 2L in which, as shown in FIG. 6($c$), the one width-direction end 2$a$ enters inside the other width-direction end 2$b$, and which is wound into roll form while having the inner and outer overlapping portions 5, 6, i.e., the roll-shaped film 2L which is configured by armor-winding with the PTEE film 2. In the description, "armor-winding" can be defined as twisting and winding of a film-like member (a sheet-like or plate-like member is available) in a state where overlapping portions of one and other ends of the member are formed.

As shown in FIG. 5, the yarn Y3 is configured by armor-winding the expanded graphite sheet member 1 having a rounded sectional shape with the PTEE film 2, i.e., shows a sectional shape which is rounded as a whole in a state where the expanded graphite sheet member 1 is not exposed. The weight percentage of the PTEE film 2 in the yarn Y of Embodiment 1 (the weight percentage of the PTEE film 2 with respect to the weight per unit length of the yarn Y) was 22.1%.

Alternatively, the expanded graphite sheet member 1 and the PTEE film 2, i.e., the outer circumferential surface of the roll-shaped sheet 1L and the inner circumferential surface of the roll-shaped film 2L may be bonded together by, for example, using an adhesive agent. Alternatively, overlapping portions 5, 6 of the PTEE film 2, i.e., the roll-shaped film 2L may be bonded together. Alternatively, a configuration where both of the bondings are performed may be possible.

Embodiment 4

Figure 7:
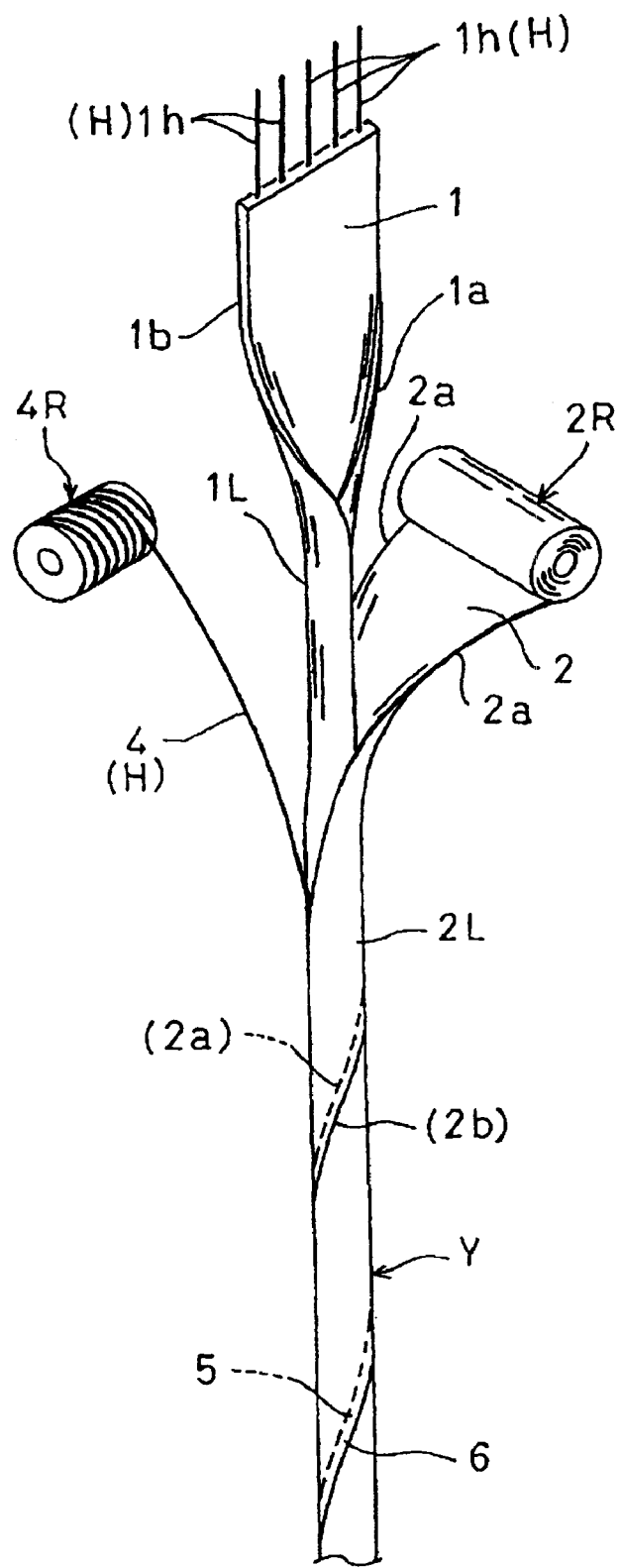
FIG. 7 is a perspective view showing a yarn of Embodiment 4 and a manner of producing it.

As shown in FIG. 7, the yarn Y of Embodiment 4 is configured by unwinding a stainless steel wire 4 (an example of the reinforcing member H) which functions as an external reinforcing member, from a wind roll 4R of a stainless steel wire (for example: thickness of 0.1 mm), and enveloping the stainless steel wire together with the roll-shaped sheet 1L formed by the expanded graphite sheet member 1, with the PTEE film 2 which is armor-wound. Namely, the yarn has the configuration where the external reinforcement is added to the yarn Y of Embodiment 1. The yarn Y which is excellent in mechanical characteristics is realized by the internal and external reinforcements due to the reinforcing wires 1h(H) that constitute the internal reinforcement, and the stainless steel wire 4(H) that constitute the external reinforcement.

Embodiment 5

As shown in FIG. 8, the yarn Y of Embodiment 5 is configured by using the yarn Y of Embodiment 3 and/or Embodiment 4 as the base member 3 [see FIG. 8(a)], and further twisting the member in the direction of arrow C [see FIG. 8(b)]. As shown in FIG. 8(b), namely, the yarn Y is a yarn formed by twisting the base member 3 configured by armor-winding the expanded graphite sheet member 1 with the PTEE film 2. Because of the twisting, there is an advantage that the yarn Y in which the mechanical characteristics are further improved can be produced. In FIG. 6, m denotes a seam due to the twisting.

[Gland Packing]

Although not illustrated, a gland packing is configured by bundling a plurality (for example, eight) of above-described yarns Y (of Embodiments 3 to 5) in the periphery of a core member (the core member may be omitted), and twisting or braiding (eight-strand square braiding or the like) to form a cord-like shape. When the cord-like shape is continuously rounded to be compression-molded, it is possible to form a gland packing in which a section has a rectangular shape, and the whole shape has a doughnut-like annular shape. For example, the gland packing is attached to a packing box in a state where a plurality of gland packings are arranged in the axial direction of a rotation shaft, and pressed by a packing cover in the axial direction, thereby enabling the packing to be used so as to exert a sealing function on the outer circumferential surface of the rotation shaft.

According to the yarn Y of the invention related to Embodiments 3 to 5, it is possible to attain functions and effects such as following 6. to 10. 6. Because of the structure where the expanded graphite sheet member 1 is enveloped with the PTEE film 2 which is pulled and aligned in longitudinal direction, the expanded graphite is not exposed while the elasticity of the expanded graphite is maintained. 7. Since the longitudinal directions of the PTEE film 2 and the expanded graphite sheet member 1 are aligned with each other, the reinforcing wire member such as a metal wire or carbon fiber which is included in order to enhance the strength in the state where it is coincident with the longitudinal direction of the expanded graphite sheet member 1 can be enveloped easily and simultaneously by the PTEE film 2.

8. Since the PTEE film 2 is placed in the surface to eliminate the exposure of the expanded graphite which is the core material, the corrosion resistance and the sliding characteristics can be improved. 9. The structure where the expanded graphite sheet member 1 is covered by the PTEE film 2 is formed not by the spiral winding as in the conventional art, but by the armor-winding. Therefore, the required amount of the PTEE film 2 can be reduced, and the cost reduction can be realized while attaining the stability at a high temperature. 10. Since the structure where the expanded graphite sheet member 1 is covered by the PTEE film 2 is formed by the armor-winding, the tensile strength of the PTEE film 2 itself can be used, and the strength of the yarn Y can be improved.

Other Embodiments

The PTEE film 2 may be a porous film or a film containing a filler.

DESCRIPTION OF REFERENCE NUMERALS 1 expanded graphite sheet member
2 PTEE film
3 base member
5, 6 overlapping portion
H reinforcing member, binder

The invention claimed is:

1. A yarn which is formed by twisting a base member configured by enveloping an expanded graphite sheet member and one or more reinforcing members with a polytetrafluoroethylene film, in a state where said polytetrafluoroethylene film, said expanded graphite sheet member, and said reinforcing member are aligned with each other in longitudinal direction,
    wherein said reinforcing member is placed outside said expanded graphite sheet member, and
    said polytetrafluoroethylene film has overlapping portions of one end and the other end in a width direction of said polytetrafluoroethylene film in the yarn.

2. The yarn according to claim 1, wherein said base member is configured by winding said polytetrafluoroethylene film around said expanded graphite sheet member having a rounded sectional shape.

3. The yarn according to claim 1 further comprising one or more second reinforcing members, wherein said expanded graphite sheet member incorporates said second reinforcing member therein, said second reinforcing member extending along a longitudinal direction of said expanded graphite sheet member.

4. The yarn according to claim 1, wherein said expanded graphite sheet member and said polytetrafluoroethylene film or/and overlapping portions of said polytetrafluoroethylene film are bonded together.

5. The yarn according to claim 1, wherein a weight percentage of said polytetrafluoroethylene film is set to 5 to 30%.

6. The yarn according to claim 1, wherein the overlapping portions of said polytetrafluoroethylene film are bonded to each other.

7. The yarn according to claim 1, wherein the reinforcing member is placed between said expanded graphite sheet member and said polytetrafluoroethylene film.

8. The yarn according to claim 2, wherein an outer surface of said expanded graphite sheet member is bonded to an inner surface of said polytetrafluoroethylene film.

9. The yarn according to claim 3, wherein said expanded graphite sheet member incorporates a plurality of said second reinforcing members therein.

* * * * *